United States Patent
Banning et al.

(10) Patent No.: US 6,850,254 B1
(45) Date of Patent: Feb. 1, 2005

(54) SYSTEM AND METHOD FOR DEFINING PARAMETER RELATIONSHIP ON USER INTERFACES

(75) Inventors: Kenneth Ray Banning, Austin, TX (US); Jack Allen Alford, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/453,251

(22) Filed: Dec. 2, 1999

(51) Int. Cl.[7] .................................................. G06F 3/00
(52) U.S. Cl. ....................................... 345/784; 345/764
(58) Field of Search ................................. 345/784, 808, 345/835, 764, 973, 974, 123, 124, 125

(56) References Cited

U.S. PATENT DOCUMENTS

| | | | |
|---|---|---|---|
| 5,280,275 A | | 1/1994 | Kaplan |
| 5,412,774 A | * | 5/1995 | Agrawal et al. ............. 345/157 |
| 5,542,039 A | | 7/1996 | Brinson et al. |
| 5,680,560 A | | 10/1997 | Gaertner |
| 5,877,758 A | | 3/1999 | Seybold |
| 6,055,480 A | * | 4/2000 | Nevo et al. ..................... 702/3 |
| 6,204,846 B1 | * | 3/2001 | Little et al. ................ 345/784 |
| 6,222,547 B1 | * | 4/2001 | Schwuttke et al. ......... 345/419 |

FOREIGN PATENT DOCUMENTS

| | | | |
|---|---|---|---|
| WO | WO9859467 | 12/1998 | ........... H04L/12/46 |

\* cited by examiner

*Primary Examiner*—Cao (Kevin) Nguyen
(74) *Attorney, Agent, or Firm*—Volel Emile; Leslie Van Leeuwen

(57) ABSTRACT

An apparatus and method of allowing a user to set relationships between two or more parameters are provided. To set up the relationship, the user invokes a dialog box within which all available parameters, as well as their current relationship, are displayed. The user is allowed to change present relationships or set up totally new relationships using parameters that are presently used or unused or combining presently used and unused parameters. Once done, the new values of the parameters are displayed. Furthermore, if a user changes the displayed value of one parameter, displayed values of the other related parameters are automatically updated.

14 Claims, 3 Drawing Sheets

SYSTEM AND METHOD FOR DEFINING PARAMETER RELATIONSHIP ON USER INTERFACES

FIELD OF THE PRESENT INVENTION

This invention relates generally to a graphical user interface (GUI), and more particularly, to a method of setting values to correlated parameters displayed in a GUI.

BACKGROUND OF THE PRESENT INVENTION

Display interfaces, such as GUIs, represent a well known presentation medium for displaying computer data to users. A GUI typically comprises a variety of display items that may include icons, images, parameters etc.

A parameter is a variable that is given a constant value for a specified application. Since a parameter is a variable, its value should be able to be changed. There are a plurality of ways to change the value of a parameter. One way is through the use of a dialog box. A dialog box is a typical control device that enables a user to view and select values of a parameter. Other ways of controlling a parameter include buttons and pull-down menus. To change parameter values using buttons, a user typically has to move the cursor onto a button associated with the desired parameter. The user then has to select the button to change its state. Pull-down menus generally require the user to move the cursor to a desired menu or the item, select the menu or item, find and select a desired value from the menu, and then release to change the value of the parameter. In either case, the cursor may be positioned using the help of either arrow keys on a computer's keyboard, mouse or any other sort of computer pointing device.

It has, for a long time, been known to allow a user to change values of parameters. Indeed, it has been known to have a user change the value of one parameter and have the value of a correlated parameter be changed automatically. However, a user has not been given the opportunity to set the relationship between two or more parameters.

Thus, there exists a need for a method and apparatus that enable a user to set the relationship between two or more parameters.

SUMMARY OF THE PRESENT INVENTION

The present invention provides an apparatus and method for allowing a user to set relationships between two or more parameters. To set up the relationship, the user invokes a dialog box within which all available parameters, as well as their current relationship, are displayed. The user is allowed to change present relationships or set up totally new relationships using parameters that are presently used or unused or combining presently used and unused parameters. Once done, the new values of the parameters are displayed. Furthermore, if a user changes the displayed value of one parameter, displayed values of the other related parameters are automatically updated.

BRIEF DESCRIPTION OF THE DRAWINGS

The present invention will be better understood and its numerous objects and advantages will become more apparent to those skilled in the art by reference to the following drawings, in which like reference numbers indicate like parts throughout the figures, in conjunction with the accompanying specification.

DETAILED DESCRIPTION OF THE PRESENT INVENTION

Figure 1:
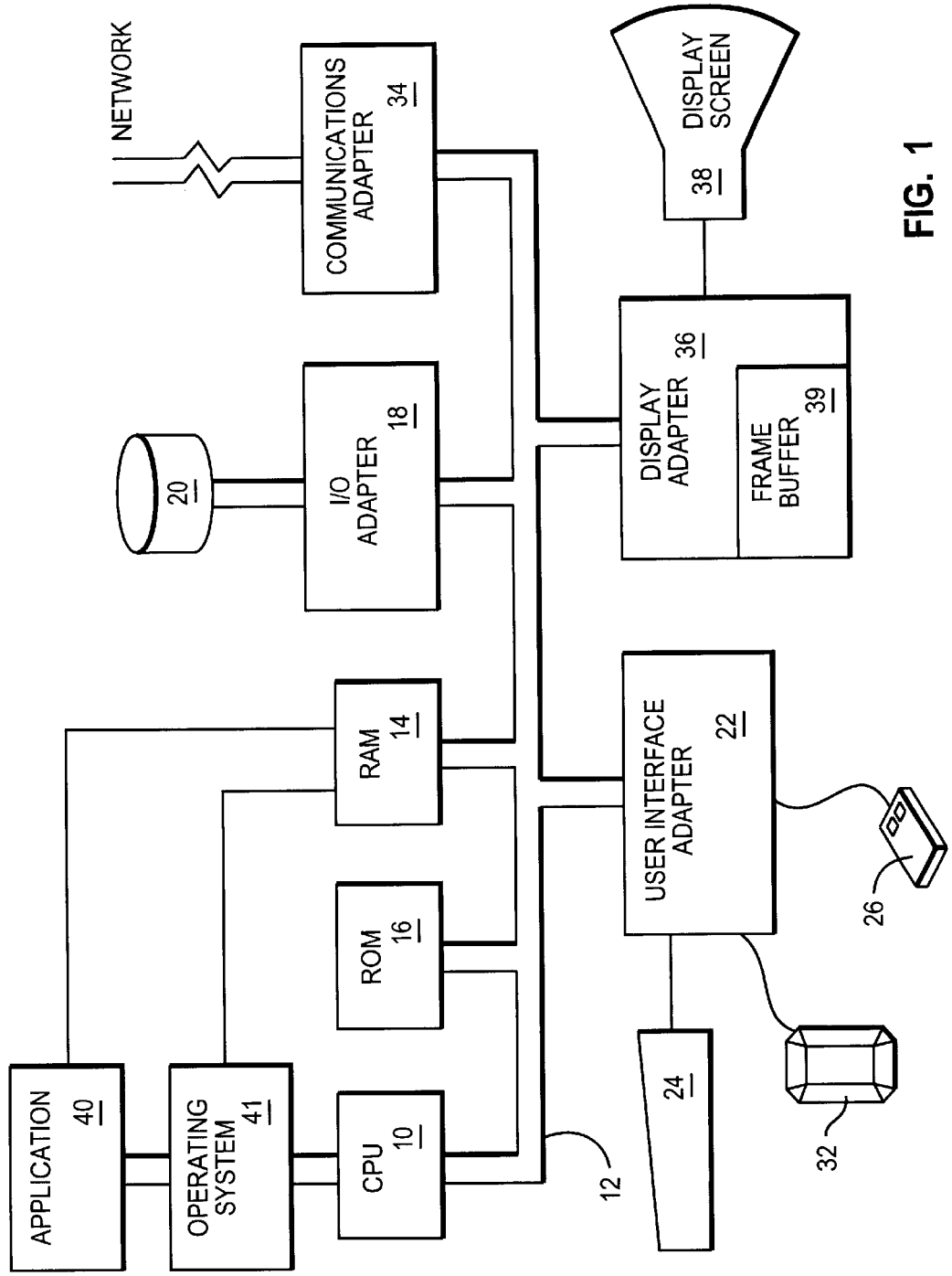
FIG. 1 depicts a general block diagram of a computer data processing system within which the invention may be implemented.

FIG. 1 represents a typical block diagram of a data processing system within which the present invention may be implemented. In FIG. 1, a central processing unit (CPU), such as one of the PowerPC microprocessors available from International Business Machines Corporation (PowerPC is a trademark of International Business Machines Corporation) is shown interconnected to various other components by system bus 12. An operating system 41 runs on CPU 10 and provides control and is used to coordinate the function of the various components of FIG. 1. Operating system 41 may be one of the commercially available operating systems. For example, it may be DOS, OS/2 (OS/2 is a trademark of IBM Corporation), Microsoft Windows 95, 98 or NT etc. An application program 40 such as the program of the present invention runs in conjunction with the operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected through system bus 12. It should be noted that software components including the operating system 41 and application 40 may reside on a hard drive or CD or diskette etc. and are loaded into RAM 14, the main memory of the computer system.

I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system and display 38.

As mentioned before, the invention allows a user to set relationships between two or more parameters. In the past, only programmers were able to define relationships, mathematical or otherwise, between two or more parameters displayed in a GUI. The invention is directed toward giving this opportunity to regular users as well. For example, a user may want to set up a certain relationship among three parameters such that when one parameter is set, the other parameters are either set automatically or ranges of possible settings are displayed. As will be shown shortly, this task can be easily achieved using the present invention.

Figure 2:
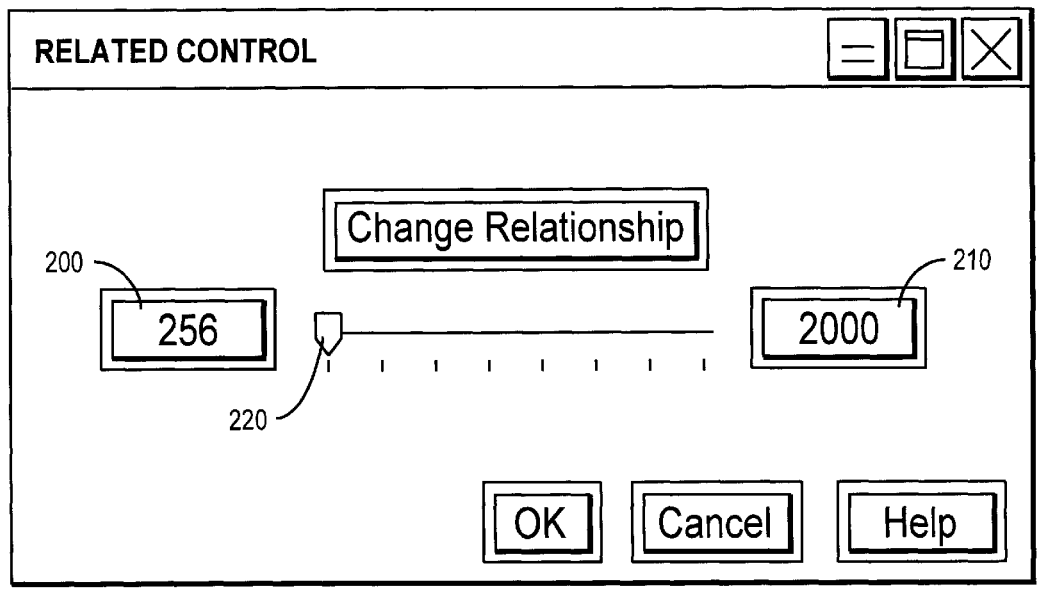
FIG. 2 illustrates a first diagrammatic view of a computer display interface in accordance with the present invention.

FIG. 2 depicts a GUI in which the values of three parameters are displayed. The three parameters are parameters x and y, the values of which are displayed in windows 200 and 210, respectively, and parameter s the value of which is represented by the location of pointer 220. In this case, the pointer 220 points to 1 and thus, the value of s is one. The values of x and y are 256 and 2000, respectively. The relationship between x and y and s may be represented by the following equations:

$$y=(m/x); x=256(s)$$

where m, x, y and s are all integers. The variable m, in this case, is a maximum number of an available resource which, in most instances, is a constant. In this embodiment, the equations are used to quickly determine how many y blocks of x bytes of a memory device having a total size m bytes there are as well as to logically partition the memory device into those blocks. The size in bytes of the blocks can be quickly changed by moving pointer s. In FIG. 2, the size (x) of the blocks is 256 bytes, the number (y) of 256-byte blocks available is 2000 in a memory device of a size (m) of 512,000 bytes.

Figure 3:
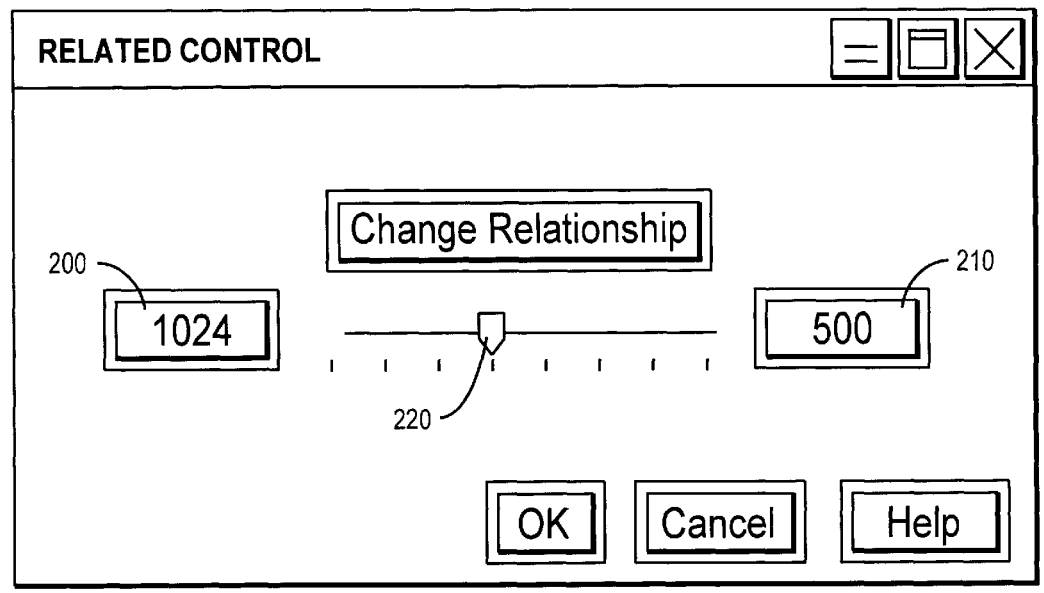
FIG. 3 illustrates a second diagrammatic view of the computer display interface in accordance with the present invention.

FIG. 3 depicts the GUI of FIG. 2 with different displayed values for the parameters. The invention, as shown in FIG. 3, allows values of all pertinent or related parameters to be reset automatically by just resetting the value of one parameter. In this case, the scaling factor (s) is reset to 4. After resetting the scaling factor, the OK button is clicked on and the values of x and y are automatically reset in accordance with the equations above. That is, the number (y) of blocks is 500 having each a size (x) of 1024 bytes.

Figure 4:
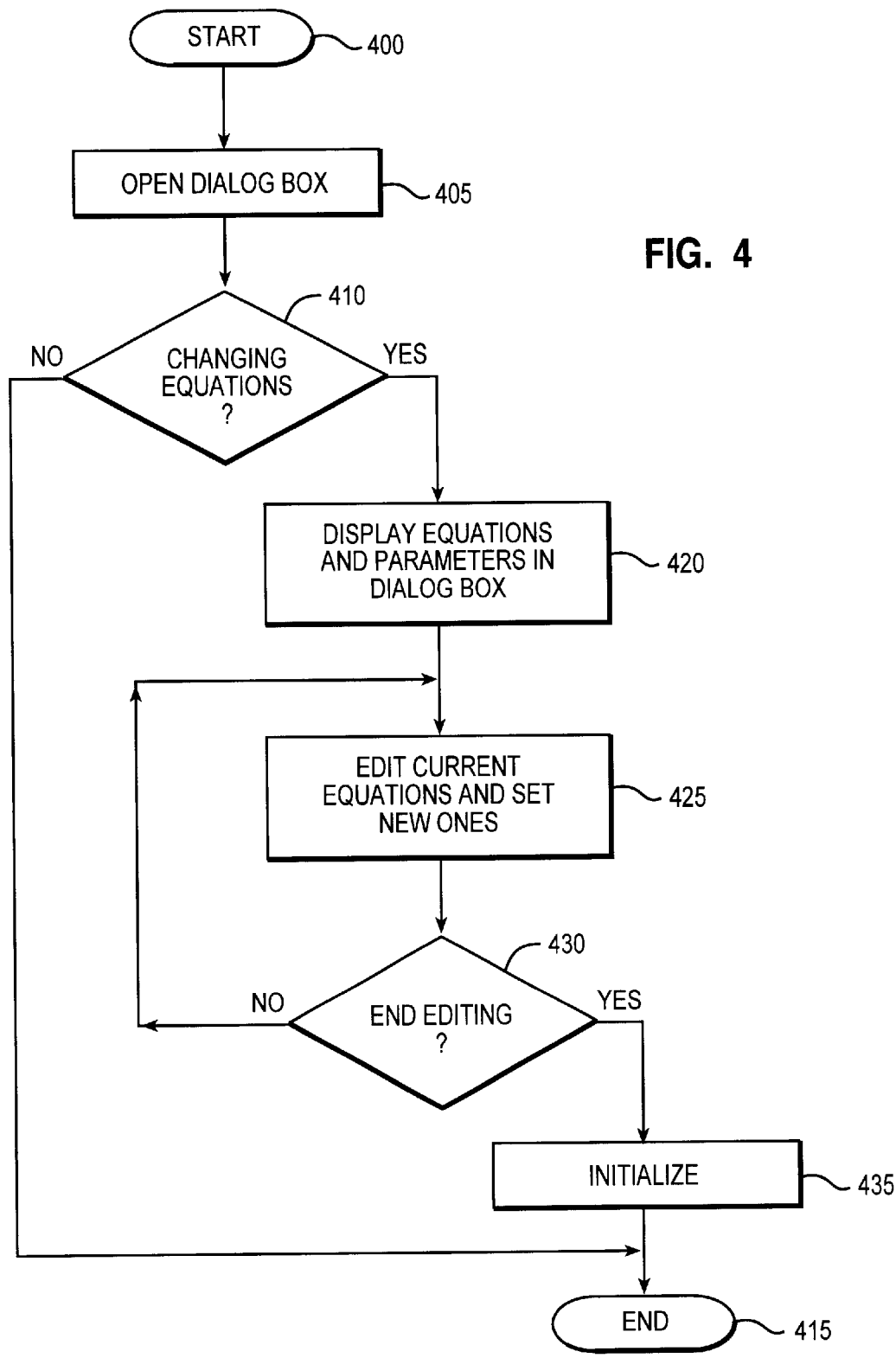
FIG. 4 is a flow chart depicting the process of implementing the present invention.

FIG. 4 depicts a flowchart of an implementation of the present invention. When a user wants to set up a relationship between two or more parameters, the user starts by opening a dialog box (steps 400 and 405). At that point, the user has to determine whether or not mathematical relationships or equations will be changed or new ones defined (step 410). If the user decides not to change the current equations or define new ones, the process ends (step 415). If, however, the user decides to either change the equations or define new ones, all the available parameters, as well as the present equations in which they are used, are displayed in the dialog box (step 420). The available parameters include parameters which are not currently being used in any of the mathematical equations as well as those that are currently in use. In the case of the present invention, if the equations were not already defined, only the parameters (x, y, s and m) would be displayed. The user then would have to define the equations above in the dialog box. That is, the user would have to set up the equations y=(m/x); x=256(s) and m=512,000. If the equations were already defined, the equations would be displayed in the dialog box. The user then would be allowed to change the equations as needed. If a parameter were not used in the equations, its window would stay empty or the value N/A would instead be displayed therein.

When defining the equations, the user has to have some knowledge of the GUI in which the value of the parameters will be displayed. For instance, in FIGS. 2 and 3, windows 200 and 210 are used to display the values of parameters x and y, respectively. If the user has this knowledge, the user can properly define the above equations such that the displayed values convey information that is meaningful to the user. Note that the invention employs the GUI shown in FIGS. 2 and 3, however, it should be obvious to one skilled in the art that any other GUI, having more or less windows to display parameter values, can be used without departing from the scope of the invention. Note also that users may be allowed to define their own GUIs although in this present invention the GUI is defined for them.

In FIGS. 2 and 3, parameter s is set to receive a value in accordance with the location of a pointer. This can be implemented by calculating the x, y coordinates of the position of the pointer on the screen in relation to the x, y coordinates of the entire GUI. A reference table can then be used to give a value to s at each position of the pointer. Other methods, which are well known in the industry, can be used as well.

Returning to FIG. 4, after the equations are defined or changed (step 430), the whole process gets initialized (step 435) to allow the new values to be displayed in the GUI. So, if s is one, the GUI in FIG. 2 is displayed; if on the other hand s is 4, the GUI in FIG. 3 is displayed. The displayed values of the parameters are also sent to the software or firmware program used to logically partition the memory device.

The description of the present invention has been presented for purposes of illustration and description, but is not intended to be exhaustive or limited to the invention in the form disclosed. Many modifications and variations will be apparent to those of ordinary skill in the art. For example, changing or setting up the relational equations may be done in several other ways including Design-by-Example. Design-by-Example is a method wherein a user describes the result of an equation and the system determines the correct equation to use. It is therefore obvious that the embodiment was chosen and described in order to best explain the principles and the practical application of the invention and to enable others of ordinary skill in the art to understand the invention for various embodiments with various modifications as are suited to the particular use contemplated. Thus, it should be understood that many changes and modifications may be made therein without departing from the scope and intent of the appended claims.

What is claimed is:

1. A system for allowing a user to define a relationship between two or more parameters having each a value displayed in a graphical user interface (GUI) comprising:
   means for displaying the parameters;
   means for allowing the user to define a relationship between the displayed parameters;
   means for displaying the value of each of the related parameters in the GUI; and
   means, when the displayed value of a parameter is changed, for automatically changing the displayed value of the other related parameters.

2. The system of claim 1 wherein the means for allowing the user to define the relationship between the displayed parameters includes means for providing a dialog box into which to define the relationship.

3. The system of claim 2 further comprising means for changing the displayed value of a parameter.

4. A method of allowing a user to define a relationship between two or more parameters having each a value displayed in a graphical user interface (GUI) comprising:
   displaying the parameters;
   allowing the user to define a relationship between the displayed parameters;
   displaying the value of each of the related parameters in the GUI; and automatically changing the displayed value of all related parameters when the displayed value of a parameter is changed.

5. The method of claim 4 wherein the step of allowing the user to define the relationship between the displayed parameters includes the step of providing a dialog box into which to define the relationship.

6. The method of claim 5 further comprising the step of changing the displayed value of a parameter.

7. The method of claim 6 wherein changing the displayed value of a parameter includes moving a pointer from one location to another location on the screen.

8. A computer program product embodied in a medium, said computer program product having a computer readable program code means for allowing a user to define a relationship between two or more parameters having each a value displayed in a graphical user interface (CUI) comprising:

computer readable program code means for displaying the parameters;

computer readable program code means for allowing the user to define a relationship between the displayed parameters;

computer readable program code means for displaying the value of each of the related parameters in the GUI; and computer readable program code means for automatically changing the displayed value of all related parameters when the displayed value of a parameter is changed.

9. The computer program product of claim 8 wherein the computer readable program code means for allowing the user to define the relationship between the displayed parameters includes computer readable program code means for providing a dialog box into which to define the relationship.

10. The computer program product of claim 9 further comprising computer readable program code means for changing the displayed value of a parameter.

11. The computer program product of claim 10 wherein changing the value of a parameter includes moving a pointer from one location to another location on the screen.

12. A computer system for allowing a user to define a relationship between two or more parameters having each a value displayed in a graphical user interface (GUI) comprising:

at least one storage device for storing code data; and at least one processor for processing the code data to display the parameters, to allow the user to define a relationship between the displayed parameters, to display the value of each of the related parameters in the GUI, and to automatically change the displayed value of the related parameters when the displayed value of a parameter is changed.

13. The computer system of claim 12 wherein allowing the user to define the relationship between the displayed parameters includes providing a dialog box into which to define the relationship.

14. The computer system of claim 13 further processing the code data to allow the user to change the displayed value of a parameter.

* * * * *